United States Patent Office 2,943,837
Patented July 5, 1960

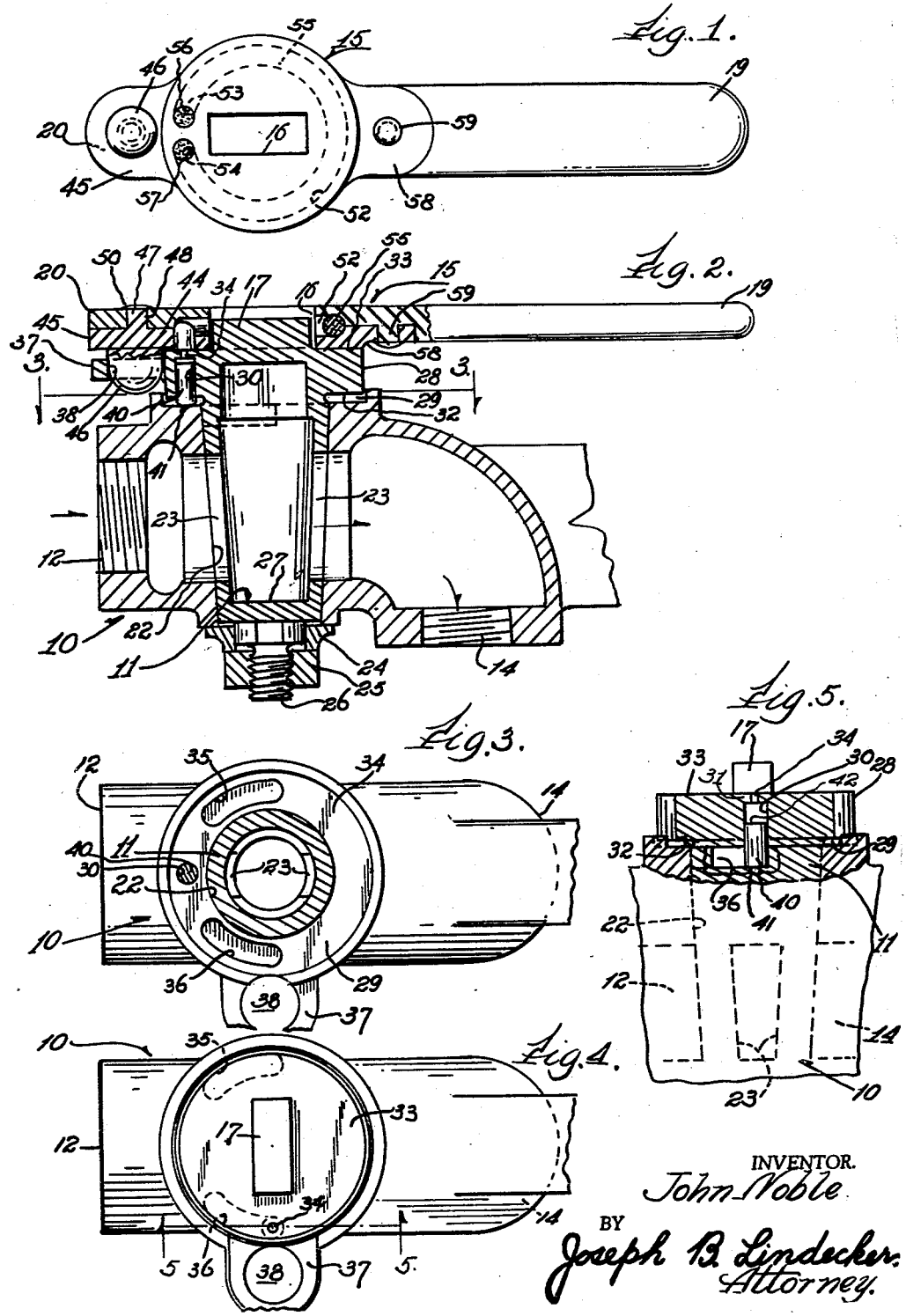

2,943,837

VALVE AND MAGNETIC ACTUATING TOOL

John Noble, 3321 W. Pierce St., Chicago, Ill.

Filed May 16, 1958, Ser. No. 735,774

8 Claims. (Cl. 251—110)

This invention relates to a locking valve and actuating tool designed primarily for use in connection with a gas supply controlling valve, but it is to be understood that a locking valve and actuating tool, in accordance with this invention, may be employed in any connection for which it is found applicable, and the invention has for its object to provide, in a manner as hereinafter set forth, means to prevent the opening of a supply valve surreptitiously.

A further object of the invention is to provide, in a manner as hereinafter set forth, means to prevent the stealing of gas from the gas mains of any public utilities, whether municipal or private, after service has been cut off from the customer on the closing of the service valve.

Another object of the invention is to provide, in a manner as hereinafter set forth, means to prevent unauthorized persons from turning the gas valve back to normal position once said person has turned the valve to closed position without authority, whereby he could tamper with the gas meter or other lines associated therewith.

Still another object of the invention is to install a movable plunger in a valve member which will fall into a bore in the valve body should the valve member be turned to a closed position and a tool with the provisions of a permanent magnet embodied therewith which will lift the plunger from the bore permitting movement of the valve member to normal position.

Other and further objects of this invention will become apparent from the disclosures in the accompanying drawing and following specification.

The invention in a preferred form is shown in the drawing and hereinafter more fully described.

Figure 1 is a bottom plan view illustrating a valve tool embodying principles of the present invention;

Figure 2 is a sectional side elevational of a valve casing and valve having the present invention embodied therein, and the tool as shown in Fig. 1 in combination therewith, with portions shown in full lines;

Figure 3 is a sectional view of the valve casing and valve principles of the invention taken along lines 3—3 in Fig. 2, the valve being in normal open position;

Figure 4 is a top plan view of the valve casing and valve embodying the principles of the present invention with the valve in closed position; and Figure 5 is a fragmentary vertical sectional view taken along lines 5—5 in Fig. 4, some portions shown in full lines and some by dotted lines.

As shown in the drawings and referring specifically to Figure 2, the reference numeral 10 indicates generally the valve casing, or body, of an angle-cock, or similar device. The valve casing 10 is provided with the rotatable plug valve 11 located within the casing, and the usual inlet 12 and the outlet 14. Mounted upon the upper end of the valve casing is the removable tool 15 as shown in Fig. 2. The body of the tool is provided with a rectangular opening 16 to fit over the rectangular head 17 of the plug valve to turn the valve as desired. The tool has a rearwardly extending handle portion 19 and forwardly extending hub portion 20.

The valve casing 10 is provided between its extremities with a vertical conical bore 22. The valve 11 is provided in its body portion with a transverse port 23, which, by rotation of the valve 11, may be thrown into alignment with the inlet and outlet openings, or by a quarter turn given thereto, may shut off communication between the inlet and outlet openings. The valve 11 is maintained snugly in its position within the bore 22 by means of a washer 24 and nut 25 threaded upon the threaded end of the stud 26 integrally formed with the base portion 27 of said valve 11. The valve casing 10 is further provided at its top with a hub portion 28 and a circular recess 29 therein. The valve 11 provided at its upper end with said rectangular head 17 is further provided with a vertical cylindrical bore 30 located in said hub portion 28 adjacent the edge portion thereof, said bore extending from the base 32 of said hub portion 28 to a depth slightly less than the thickness of said hub leaving a wall 31 intermediate said bore and the top surface 33. A vertical channel 34 extends between said bore 30 and said top surface 33 of said hub 28. The valve casing 10 is provided with two arcuate recesses 35 and 36 in its hub portion 28, said arcuate recesses being formed in the base portion 34 of said circular recess 29 and substantially above the inlet portion 12 of said valve casing 10. Each of said arcuate recesses 35 and 36 extending approximately one sixth the circumference length of said circular recess 29 and extending to a plane passing vertically through the center of said conical bore 22 and at right angles to said inlet portion 12. Said hub portion 28 of said valve 11 is formed with an outwardly extending boss 37 with a central circular opening 38. A steel locking plug 40 of cylindrical configuration is inserted in the bore 30 when the valve 11 is assembled with the valve casing 10. Said plug 40 is slightly less in diameter than the bore 30 so as to be freely movable therein, and approximately the same length as the depth of the bore. The plug 40 drops downwardly due to its weight and the lower end 41 thereof rides upon the horizontal surface of base portion 34 of recess 29. When the valve 11 is turned 45 degrees or more said plug 40 will drop still further into one of said arcuate recesses 35 or 36 according to direction of movement of the valve, if the valve is turned clockwise the plug will drop into recess 35 so that its lower end portion will ride upon the bottom surface of said recess 35; if the valve is turned counterclockwise said plug will drop into recess 36; the upper end portion 42 of said plug 40 is always retained within said bore 30 as the distance of travel performed by the plug 40 is substantially equal to one-half the length of the plug 40.

The removable tool 15, with handle portion 19 and hub portion 20 has a valve actuating member 44 attached to the hub portion 20 thereof. Said valve actuating member 44 comprising a flat central portion 45, a lower semi-spherical portion 46 and an upwardly and centrally arranged vertical rivet type stub 47. Said hub portion 20 of said tool has a centrally located vertical bore 48 therein. The valve actuating member 44 is assembled by inserting said rivet type stub 47 into said bore 48 from the lower end thereof. The upper end 50 of said stub 47 is riveted into tight engagement with the top surface of said hub 20.

The forward circular portion of said tool 15 surrounding the rectangular opening 16 is provided with a substantially circular recess 52 extending horizontally inwardly between the top surface and lower surface thereof, said recess 52 terminating into two downwardly turned passages 53 and 54 short of a complete circle with a solid section between the ends thereof; said downwardly turned passages 53 and 54 providing a vertical outlet to the lower surface of the tool. A permanent magnet 55 of the same circular configuration as the recess 52 is placed in said recess 52, the ends 56 and 57 of the magnet being turned downwardly to fit into the verticaln passageways 53 and 54. The ends of the magnet 56 and 57 are positioned to travel in a circle directly over the steel locking pin 40 and arcuate recesses 35 and 36 when the tool 15 is rotated. The magnet 55 is assembled in the tool 15 by removal of a lower section 58 of the tool, after assembly of the section is riveted in place by rivet 59 formed with and depending from handle 19. The permanent magnet 55 may be described as a substantially horse-shoe shaped magnet 55 with depending end portions 56 and 57 as shown by Fig. 1. The ends 56 and 57 of the magnet fitting tightly in passageways 53 and 54.

When an unauthorized person desires to turn off the gas, said person would use an ordinary wrench. On turning the valve 45 degrees or more, the pin 40 will fall downwardly into recess 36. When said person tries to turn on the gas, he will attempt to turn the valve to normal open position but will find it impossible to do so as the pin 40 remains in the recess 35, or 36, preventing turning of the valve to normal fully open position. The obstruction point will be midway between fully open and fully closed position of the valve. Not knowing about the concealed pin in the valve casing he will be required to call an authorized service-man from the public utility. The service-man will apply his valve tool 15 with the permanent magnet concealed therein. The vertical force distance between the ends 56 and 57 of the permanent magnet and the top of the pin 40 is very short in relation to the effective lifting force of said permanent magnet 55. The force difference is therefore determined entirely by the weight of the pin. The passage, or vertical channel 34 extends between said bore 30 and said top surface 33 of the hub 28 allows any entrapped air to escape. The lifting force of the magnet at the poles 56 and 57 less the weight of the pin 34 is always enough to lift the pin to permit rotation of the valve 11 to open position without detection by the unauthorized person of the novel embodiments of the valve tool.

The public utility organization can and should prevent the general public from realizing how the magnetic type tool functions. By locating valves turned to inoperative positions they will locate the unauthorized person so often doing unauthorized acts such as turning on and off the gas valve at the meter to apply means to steal gas at a future date.

Permanent magnets of the aluminum nickel alloy type, as well as other types, have been developed in recent years to such an extent that coercive force of these magnets prevent demagnetization by heat or shock or the like and permit a permanent magnet to capably operate in the capacity hereinbefore described.

I am aware that numerous details of construction may be varied throughout a wide range without departing from the principles and purposes of my invention, and I therefore do not intend limiting the scope of my patent otherwise than as necessitated by the prior art.

I claim as my invention:

1. A flow controlling device comprising a valve casing, a rotary valve in said valve casing, a tool to rotate said valve, a head upon said valve, said tool embodying a handle portion on one end and a hub portion on its other end, an aperture in the hub of said tool of the same configuration as the configuration of said head on said valve, a permanent magnet embodied within said tool, said valve embodying an upper hub portion, a vertical bore in said valve hub portion open to its lower end, a pin, said pin movably mounted within said bore, the lower end of said pin in sliding contact with an upper surface of said valve casing in its normal first position while in use, an arcuate recess in the upper surface of said valve casing, said pin movable into said arcuate recess for holding said valve against rotary movement when said valve is rotated to a second position of non-use by a non-magnetic tool, and said permanent magnet in said tool arranged with its poles to move above the path of travel of said pin, said poles embodying a lifting force to lift said pin upwardly out of said recess to release said valve whereby said valve can be turned from said second position to the first position.

2. A flow controlling device comprising a valve casing, a rotary cone shaped valve in said casing, a removable tool, said valve embodying an upper hub portion, a rectangular shaped head upon said upper hub portion of said valve, a rectangular shaped aperture in one end of said tool of substantially the same configuration as said rectangular shaped head upon said valve and adapted to fit over said head, a permanent magnet assembled within said removable tool with its poles adjacent said aperture, a circular recess formed in the upper surface of said valve casing and encircling said valve arranged therein, an arcuate recess in the lower surface of said circular recess, a vertical bore in said upper hub portion of said valve with an open lower end, a pin, said pin movably mounted within said bore in its original first position, the lower end of said pin in sliding contact with the bottom surface of said circular recess, said pin movable into said arcuate recess when said valve is rotated to a second position by a non-magnetic tool, and said permanent magnet in said removable tool arranged with its poles to travel above said circular recess, said poles embodying a lifting force to effect said pin upwardly out of said arcuate recess when therein and to control the free rotation of said valve whereby said valve can be rotated to its original first position and said pin will rest in said circular recess.

3. A flow controlling device comprising a valve casing, a rotatable valve, a slidable pin located in said valve, a recess in the upper portion of said valve casing, said pin adapted to move downwardly due to force of gravity into said recess and into and out of engagement with the end walls of said recess preventing complete rotation of said valve, a tool to rotate said valve, and said tool embodying a magnet adapted to lift said pin from said recess to release the rotary valve.

4. A flow controlling device comprising a valve casing, a rotatable valve, a shiftable metal pin located within a vertical bore in said valve, a circular recess in the upper portion of said valve casing, an arcuate recess in the lower surface of said circular recess, the lower end of said pin adapted to slide upon the lower surface of said circular recess and drop into said arcuate recess when said valve is rotated, said pin moving into engagement with the end walls of said arcuate recess preventing complete rotation of said valve, and a magnetic tool adapted to lift said pin from said arcuate recess to permit complete rotation of said valve.

5. A flow controlling device comprising a valve casing, a rotatable valve, a magnetic tool, a rectangular head on said valve, a rectangular aperture in said tool to fit over and into engagement with said rectangular head, a hub portion upon the upper end of said valve, a vertical bore in said hub portion and open at its lower end, a cylindrical shiftable metal pin located in said bore, a circular recess in the upper surface of said valve casing, a plurality of arcuate recesses in the lower surface of said circular recess spaced apart circumferentially, the lower end of said pin adapted to slide upon the lower surface of said circular recess and drop into one of said arcuate recesses when said valve is rotated and preventing return movement thereof, said tool embodying a permanent magnet, said magnet adapted to lift said metal pin upwardly from an arcuate recess effecting free movement of said valve when applied to said valve.

6. A flow controlling device comprising a valve casing, a rotatable valve, said valve having an upper hub portion, a recess in the upper surface of said valve casing, a vertical bore in the lower surface of said hub portion, a metal pin slidable within said bore, the lower end of said pin projecting downwardly from said bore and in contact with the upper surface of said casing and adapted to drop into said recess and hold said valve against rotary movement when said valve is rotated from its original position, and a tool removably mounted upon said valve, said tool embodying a permanent magnet, said tool for retracting the pin from said recess when applied to said valve to release the valve and effect free rotation thereof.

7. A flow controlling device, comprising a valve casing, a rotatable valve, a tool for rotating said valve including a permanent magnet, a vertical bore in said valve, a metal pin slidably mounted within said bore, a recess in said valve casing, the lower end of said pin adapted to drop downwardly into said recess when said valve is partially rotated preventing further rotation thereof, whereby upon application of said tool upon said valve, the said pin is caused to move upwardly under the influence of the magnetic flux between the magnet and the pin allowing the valve to be rotated to any position.

8. A flow controlling device comprising a valve casing, a rotary valve in said casing, a lever for operating said valve, a vertical bore within said valve, a pin slidable in and normally supported in said vertical bore when said valve is in one position, a recess within said valve casing, said pin having a lower end portion to extend into said recess when said valve is turned to a second position for holding said valve against rotary movement to the first position, said lever comprising a permanent magnet with poles adapted to lift said pin thereby lifting the lower portion of the pin out of said recess to release the said valve whereby said valve can be turned from said second position to the first position.

References Cited in the file of this patent

UNITED STATES PATENTS

| | | |
|---|---|---|
| 557,943 | Bayley | Apr. 7, 1896 |
| 2,328,446 | Fuehrer | Aug. 31, 1943 |